United States Patent
Utsunomiya et al.

(10) Patent No.: US 9,648,893 B2
(45) Date of Patent: May 16, 2017

(54) AERATED FAT-BASED CONFECTIONERY

(75) Inventors: Hiroyuki Utsunomiya, Saitama (JP);
Masamitsu Tanaka, Shizuoka (JP);
Yuka Nagashima, Tokyo (JP);
Takanori Chiwata, Vancouver (CA)

(73) Assignee: MEIJI CO., LTD., Tokyo (JP)

( * ) Notice: Subject to any disclaimer, the term of this patent is extended or adjusted under 35 U.S.C. 154(b) by 109 days.

(21) Appl. No.: 13/823,900

(22) PCT Filed: Sep. 15, 2011

(86) PCT No.: PCT/JP2011/071071
§ 371 (c)(1),
(2), (4) Date: Jun. 26, 2013

(87) PCT Pub. No.: WO2012/036230
PCT Pub. Date: Mar. 22, 2012

(65) Prior Publication Data
US 2013/0273229 A1    Oct. 17, 2013

(30) Foreign Application Priority Data
Sep. 17, 2010    (JP) ................................. 2010-208812

(51) Int. Cl.
| A23G 1/52 | (2006.01) |
| A23G 1/00 | (2006.01) |
| A23G 1/56 | (2006.01) |
| A23G 3/34 | (2006.01) |
| A23G 3/40 | (2006.01) |
| A23G 7/00 | (2006.01) |
| B26F 3/12 | (2006.01) |

(52) U.S. Cl.
CPC .............. *A23G 1/005* (2013.01); *A23G 1/52* (2013.01); *A23G 1/56* (2013.01); *A23G 3/346* (2013.01); *A23G 3/40* (2013.01); *A23G 7/0018* (2013.01); *B26F 3/12* (2013.01)

(58) Field of Classification Search
CPC ........ A23G 1/005; A23G 1/52; A23G 7/0018; B26F 3/12
USPC ........................................................ 426/601
See application file for complete search history.

(56) References Cited

U.S. PATENT DOCUMENTS

| 4,020,643 | A | * | 5/1977 | Roberts et al. ................ 62/322 |
| 4,251,561 | A | * | 2/1981 | Gajewski ...................... 426/571 |
| 4,714,620 | A | * | 12/1987 | Bunick et al. ............... 426/572 |
| 4,751,878 | A | * | 6/1988 | Lopes ...................... A23G 9/04 99/450.1 |
| 5,017,390 | A | * | 5/1991 | Sawant ................ A23G 3/2069 426/100 |
| 5,126,160 | A | | 6/1992 | Giddey et al. |
| 5,820,912 | A | * | 10/1998 | Beckett .................. A23G 1/202 426/100 |
| 6,482,464 | B1 | * | 11/2002 | Asama ..................... A23G 1/36 426/312 |
| 6,713,100 | B1 | * | 3/2004 | Schmoutz et al. .............. 426/89 |
| 7,754,260 | B2 | * | 7/2010 | Kruik et al. .................. 426/275 |
| 2006/0093708 | A1 | * | 5/2006 | Yaseen ................... A23G 9/286 426/101 |
| 2009/0142467 | A1 | * | 6/2009 | Aldred et al. ................ 426/572 |
| 2012/0027907 | A1 | * | 2/2012 | Haedelt et al. .............. 426/572 |
| 2014/0087031 | A1 | | 3/2014 | Kuwano et al. |

FOREIGN PATENT DOCUMENTS

| GB | WO2006/122823 | * 11/2006 |
| WO | 2006/040127 | 4/2006 |

OTHER PUBLICATIONS

The De Zaan Cocoa Products Manual, ADM Cocoa B.V., 1999, pp. 134, 135, 137, 147, and 148.

* cited by examiner

*Primary Examiner* — Jeffrey Mornhinweg
(74) *Attorney, Agent, or Firm* — Wenderoth, Lind & Ponack, L.L.P.

(57) ABSTRACT

Disclosed is an aerated fat-based confectionery that, unlike a conventional shell-type or tapered shape, has a novel shape, that is, a cubic or rectangular parallelepiped shape having top, bottom, and side surfaces in contact with and perpendicularly to each other, or any shape such as an animal or flower shape having a given thickness, has a light texture and a sharp melt-in-the-mouth sensation, does not require alignment in packaging. The confectionery can be obtained by aerating a fat-based confectionery mass having a fat content of 30 to 60% by weight such as chocolate to a specific gravity of 0.5 to 1.0 and cutting the aerated mass with a heated wire so that the side surface is perpendicularly to the top and bottom surfaces.

9 Claims, No Drawings

1

AERATED FAT-BASED CONFECTIONERY

RELATED APPLICATION

This application is based upon and claims the benefit of priority from the prior Japanese Patent Application No. 208812/2010, filed on Sep. 17, 2010, the entire contents of which are incorporated herein by reference.

TECHNICAL FIELD

The present invention relates to an aerated fat-based confectionery and a method for producing the same. More specifically, the present invention relates to an aerated fat-based confectionery having a cubic or rectangular parallelepiped shape that includes top and bottom surfaces parallel to each other and a side surface provided perpendicularly to the top and bottom surfaces and a method for producing the same.

BACKGROUND ART

Aerated chocolate confectioneries, i.e., aerated fat-based confectioneries are well known as so-called "air chocolate," which is obtained by dispersing micro bubbles in a flowable chocolate mass and then cooling and solidifying the chocolate mass with the micro bubbles dispersed therein. Such aerated fat-based confectioneries have light texture and sharp melt-in-the-mouth sensation different from that of the conventional chocolates, and this texture adds a value to confectioneries and serves as an appeal point to consumers. A method using a mold is generally considered for the production of such aerated fat-based confectioneries. Since fat-based confectioneries with micro bubbles dispersed therein have a fragile texture and are less likely to cause shrinkage of the mass in cooling and solidification, it would be difficult to separate the fat-based confectionery from the mold. Due to the fragile texture, it is also difficult to apply a physical cutting means to the confectionery while maintaining the shape. To overcome this drawback, for example, a product obtained by preparing an outer shell using a chocolate mass with micro bubbles not dispersed therein and filling a mass with micro bubbles dispersed therein into the shell has been proposed (JP H08(1996)-242768 (PTL 1)). The application of a technique in which taper is provided so as to open in the direction of an opening of the mold from the viewpoint of easily taking out the molded product from the mold and, further, for example, the surface of the mold is rendered matte to improve the separability is also considered effective (JP H08(1996)-289729A (PTL 2)).

In the shell-type confectioneries including an aerated fat-based confectionery having an outer surface covered with a conventional mass with micro bubbles not dispersed therein, however, the aerated fat-based confectionery located on the inner side of the shell melts after melting of the outer shell. Thus, disadvantageously, instant sharp melting sensation in the mouth cannot be provided in eating time. With the taper which is provided in a mold from the viewpoint of easily taking out a molded product in order to obtain a molded product composed of an aerated fat-based confectionery only without using a shell, the shape and area of the top surface of the resultant confectionery is different from the shape and area of the bottom surface. Consequently, in some packaging form, alignment of the product pieces in an identical direction is necessary.

Methods are known in which confectioneries are cut with a hot-wire form cutter or a heated wire. Examples thereof include a method that includes dropping a solidified ice confectionery mass on a heating wire to dissolve and cut the confectionery mass (JP S58(1983)-107139A (PTL 3)), a method that includes cutting ganache or jelley molded into a plate form with a piano wire (JP 2000-24992A (PTL 4)), and a method that includes cutting a plate or rectangular parallelepiped confectionery with thin wires stretched perpendicularly to each other, in longitudinal and lateral directions by single movement (JP 2000-262218A (PTL 5)). Further, a method is also known that includes extruding an ice confectionery with air introduced thereinto into a strand shape and cutting the strand with a high-temperature heated wire (JP 2002-503491A (PTL 6)). Furthermore, a cutter is known that includes a combination of a crossed wire with a transverse wire provided perpendicularly to the crossed wire and is used for cutting a cooking ingredient in an efficient and safe manner into small cubes (JU 3101735B (PTL 7)). These patent publications that disclose methods using high-temperature wires do not disclose chocolates, especially aerated fat-based confectioneries, as a cutting object.

CITATION LIST

Patent Literature

[PTL 1] JP H08(1996)-242768A
[PTL 2] JP H08(1996)-289729A
[PTL 3] JP S58(1983)-107139A
[PTL 4] JP 2000-24992A
[PTL 5] JP 2000-262218A
[PTL 6] JP 2002-503491A
[PTL 7] JU 31017356

SUMMARY OF THE INVENTION

Technical Problem

The present inventors have now found that a columnar or cubic aerated fat-based confectionery that has top and bottom surfaces parallel to each other and a side surface provided perpendicular to the top and bottom surfaces can be obtained by using a heated wire without providing the shell used in the conventional confectionery and without using a mold provided with a taper and having a matte surface.

Accordingly, an object of the present invention is to provide a columnar or cubic aerated fat-based confectionery that provides immediate sharp melting sensation in eating time and has top and bottom surfaces parallel to each other and a side surface provided perpendicularly to the top and bottom surfaces, and a method for producing the same.

Solution to Problem

According to the present invention, there is provided an aerated fat-based confectionery having a shape comprising: top and bottom surfaces that are parallel to each other; and a side surface provided perpendicularly to the top and side surfaces.

Further, according to the present invention, there is provided a method for producing an aerated fat-based confectionery, the method comprising cutting an aerated fat-based confectionery with a heated wire.

Advantageous Effects

The aerated fat-based confectionery according to the present invention can be produced without the shell on the outer which is made of a fat-based confectionery layer free from micro bubbles, and, thus, can be a product that, when placed in the mouth in eating time, provides immediate sharp melting sensation. Further, in the aerated fat-based confectionery according to the present invention, all of the top, bottom, and side surfaces are perpendicular to each other, and, thus, the necessity of distinguishing the obverse and reverse can be eliminated. Accordingly, particularly in a regular hexahedron, advantageously, alignment of the product pieces in packaging is very easy.

In the method for producing an aerated fat-based confectionery according to the present invention, a confectionery having a shape including top and bottom surfaces parallel to each other and a side surface provided perpendicularly to the top and bottom surfaces can be obtained. However, the aerated fat-based confectionery obtained by the method according to the present invention is not limited to the confectionery having this shape. Specifically, cutting with a heated wire can realize the production of confectioneries having a desired free shape, and, for example, the production of confectioneries having an animal or flower shape is possible. Also in these shapes, there is no need to distinguish the obverse and reverse, making it easy to align product pieces.

DESCRIPTION OF EMBODIMENTS

The aerated fat-based confectionery according to the present invention is produced by cutting with a heated wire. As described above, the heated wire has hitherto been recognized as a means for cutting confectioneries and foods. However, it is well known that the fat-based confectioneries such as chocolates are whitened when melted by heating and then again solidified. This phenomenon is called "bloom" phenomenon. A main cause of this phenomenon is floating of the melted cocoa butter in the chocolate on the surface, and the blooming results in a loss of appearance and taste of the product and thus has been regarded as a phenomenon to be avoided. Since cutting with a heated wire involves melting at a cut surface, it is considered that the application of the heated wire to the chocolate occurs the bloom phenomenon. The present inventors have experimentally confirmed that, when a general chocolate is cut by a heated wire, a bloom phenomenon is noticed at the cut surface. Surprisingly, however, it has been fund that an aerated fat-based confectionery can be cut by a heated wire without sacrificing the appearance and taste of the product. Without being bound by any particular theory, the reason for this is believed to be as follows. Specifically, the aerated fat-based confectionery contains air in its interior portion. Accordingly, the absolute amount of the chocolate to be cut is reduced. Further, the absolute amount of the chocolate component, particularly the cocoa butter component, is also reduced. It is considered that the amount of the cocoa butter to be heated, melted, and resolidified by the heated wire is so small that the bloom phenomenon on a level that causes a loss of appearance and taste of the product does not occur.

Accordingly, in one embodiment of the present invention, cutting with a heated wire that is placed perpendicularly to the upper and lower surfaces of the aerated fat-based confectionery to be cut can provide a fat-based confectionery having a shape including top and bottom surfaces parallel to each other and a side surface provided perpendicularly to the top and bottom surfaces. In the conventional method using a mold, due to the presence of taper, the aerated fat-based confectionery should have a shape open in the direction of the opening in the mold. According to the present invention, however, all of the top, bottom, and side surfaces are in contact with and perpendicularly to each other, and, thus, there is no need to distinguish obverse and reverse. In particular, in a regular hexahedron, alignment of the product pieces is unnecessary in packaging. Further, according to the present invention, the aerated fat-based confectionery can be produced without the shell on the outer which is made of a fat-based confectionery layer free from micro bubbles, and, thus, can be a product that, when placed in the mouth in each time, provides immediate sharp melting sensation.

Further, in the method for producing an aerated fat-based confectionery according to the present invention, a confectionery having a shape including top and bottom surfaces parallel to each other and a side surface provided perpendicularly to the top and bottom surfaces is obtained. However, the aerated fat-based confectionery obtained by the method according to the present invention is not limited to the confectionery having this shape. Specifically, cutting with a heated wire can realize the production of confectioneries having a desired free shape, and, for example, the production of confectioneries having an animal or flower shape is possible. Also in these shapes, there is no need to distinguish the obverse and reverse so that alignment of the product pieces is advantageously easy. In another embodiment of the present invention, the heated wire may be placed not only perpendicularly to but also at a given angle to the upper and lower surfaces of the aerated fat-based confectionery, followed by cutting. Consequently, aerated fat-based confectioneries having a very wide variety of shapes can be advantageously provided.

In the present invention, any fat-based confectionery that contains fat-based and is melted by a heated wire, such as chocolates, can be employed. Preferably, the mass of the aerated fat-based confectionery has a specific gravity of 0.5 to 1.0, more preferably 0.6 to 1.0. Chocolate has a specific gravity of about 1.2 before aeration. In the case of chocolate, an aerated fat-based confectionery mass having a desired specific gravity is obtained by aerating the chocolate with, for example, an air mixer to disperse micro bubbles in the chocolate. A specific gravity in the above-defined range is advantageous in that a texture strength high enough to avoid breaking during the production is obtained, mass production of the aerated fat-based confectionery is possible, and light texture inherent in aerated fat-based confectioneries can be realized.

The type of gas dispersed in the fat-based confectionery mass is not particularly limited, and, for example, air and nitrogen gas are suitable. Preferably, inert gases such as nitrogen gas are used from the viewpoint of maintaining flavor of confectioneries.

In the present invention, the content of oil in the fat-based confectionery mass is preferably 30 to 60% by weight. A fat content in the above-defined range is advantageous in that the mass is satisfactorily melted by a heated wire in a short time, a product having a flat cut surface is obtained, and a confectionery that has satisfactory heat resistance and is less likely to cause inconvenience, for example, to get hand dirty in eating time.

The heated wire used in the present invention may be formed of any material that, when energized, emits heat, such as stainless steel (hereinafter referred to as "SUS"), nichrome wires, and copper wires. The surface temperature of the heated wire in cutting may be properly determined by taking into consideration, for example, components of the fat-based confectionery. The surface temperature, however, is preferably 40 to 80° C., more preferably 60° C. to 80° C. The surface temperature in the above-defined range can melt the fat-based confectionery mass in a short time in cutting. The relative speed of the heated wire to the mass may also be properly determined by taking into consideration, for example, the specific gravity and fat content of the mass and the temperature of the heated wire. In general, however, the relative speed is desirably approximately 30 to 65 mm/sec.

The fat-based confectionery according to the present invention can be produced, for example, by mixing a fat, a milk powder, sugar, and other materials together to obtain a flowable mass, dispersing micro bubbles in the mass with an air mixer or the like, casting the mass with micro bubbles dispersed therein on a conveyor belt, bringing the thickness of the mass to a given value, cooling the mass, and forming the mass into a sheet. After satisfactorily cooling the sheet, the sheet is cut with a heated wire, and then cooling the cut pieces.

The cut fat-based confectionery can also be dusted with cocoa powder or sugar powder for decoration. When breaking of the shape is not desired, the powder may be sprayed on a cross section immediately after cutting. On the other hand, when some breaking of the shape is acceptable, from the viewpoint of efficient dusting, a method may be adopted in which product pieces after cutting with a heated wire are rapidly introduced into a rotary oven and are then dusted. In this case, the resultant product pieces have a shape like a dice, of which the corner is round, or a shape as obtained by "chamfering" a food ingredient that is likely to undergo shape breaking.

Products obtained according to the present invention include aerated fat-based confectioneries having rectangular parallelepiped shapes such as dice-like shapes that do not require alignment in packaging, and aerated fat-based confectioneries having any desired shape such as an animal or flower shape having a given thickness that does not require distinguishment of the obverse and reverse.

EXAMPLES

The present invention is further illustrated by Examples that are not intended as a limitation of the invention.

Example 1

Cacao mass, sugar, dry whole milk, cocoa butter, cocoa butter equivalent, lecithin, flavor, and BOB (manufactured by Fuji Oil Co., Ltd., Bobster) were mixed together according to a formulation specified in Table 1, and a chocolate mass having a fat content of 50% by weight was produced by a conventional method. The chocolate mass thus obtained was mixed with an air mixer to obtain an aerated chocolate mass having a specific gravity of 0.85. In order to improve separability, the aerated chocolate mass was cast on a belt heated at 50° C., was scraped to have a height of 20 mm, and was thoroughly cooled to obtain a sheet-shaped aerated chocolate mass. The cooled sheet-shaped mass was cut with a heated wire that was provided with spring wires of SUS (SUS304-WPB) arranged at intervals of 20 mm and was set so that the surface temperature was brought to 70° C., at a relative speed of 50 mm/sec relative to the mass into a columnar form. The cut pieces thus obtained were again passed through the heated wire in a direction perpendicular to the cut surface to obtain a dice-shaped air-containing chocolate having one side length of 20 mm. Unlike a chocolate press-cut with a cutting blade, the cross section of the dice-shaped chocolate thus obtained had a flat surface rather than a rough surface.

TABLE 1

|  | (% by weight) |
|---|---|
| Cacao mass | 20.00 |
| Sugar | 31.45 |
| Dry whole milk | 12.00 |
| Cocoa butter | 8.00 |
| Cocoa butter equivalent | 25.00 |
| Lecithin | 0.50 |
| Flavor | 0.05 |
| BOB | 3.00 |
| Total | 100.00 |

Example 2

A 15 mm-height aerated chocolate mass was obtained in the same manner as in Example 1. A thoroughly cooled mass was cut out with a heated wire installed perpendicularly to the mass into a flower form to obtain a desired product. In the product, the flower shape could be recognized from both obverse and reverse, and all of the top, bottom, and cut surfaces were a smooth flat surface.

Example 3

Cacao mass, sugar, non-fat dry milk, cocoa butter, lecithin, flavor, and BOB (manufactured by Fuji Oil Co., Ltd., Bobster) were mixed together according to a formulation specified in Table 2, and an aerated chocolate mass having a fat content of 20% by weight and a specific gravity of 0.7 was produced in the same manner as in Example 1. The mass thus obtained was formed into a sheet in the same manner as in Example 1. The sheet was cut with a heated wire set so that the surface temperature was brought to 80° C. The product thus obtained had a little of wavy pattern on the surface, which might be caused by an un-complete melting when cut, but was acceptable as a commercial product.

TABLE 2

|  | (% by weight) |
|---|---|
| Cacao mass | 17.00 |
| Sugar | 52.00 |
| Non-fat dry milk | 17.45 |
| Cocoa butter | 10.00 |
| Lecithin | 0.50 |
| Flavor | 0.05 |
| BOB | 3.00 |
| Total | 100.00 |

Example 4

Cacao mass, sugar, dry whole milk, cocoa butter, cocoa butter equivalent, lecithin, flavor, and BOB (manufactured by Fuji Oil Co., Ltd., Bobster) were mixed together according to a formulation specified in Table 3, and an aerated chocolate mass having a fat content of 65% by weight and a specific gravity of 0.7 was produced in the same manner as in Example 1. The mass thus obtained was formed into a sheet in the same manner as in Example 1. The sheet was cut with a heated wire set so that the surface temperature was brought to 60° C. The product thus obtained had the surface which could easily be melted, but was not in such a level that the shell layer containing an un-satisfactory amount of micro bubbles that were discernible in the mouth was formed.

TABLE 3

|  | (% by weight) |
| --- | --- |
| *Cacao* mass | 19.00 |
| Sugar | 18.45 |
| Dry whole milk | 12.00 |
| Cocoa butter | 15.00 |
| Cocoa butter equivalent | 32.00 |
| Lecithin | 0.50 |
| Flavor | 0.05 |
| BOB | 3.00 |
| Total | 100.00 |

Example 5

Cacao mass, sugar, dry whole milk, cocoa butter, cocoa butter equivalent, lecithin, flavor, and BOB (manufactured by Fuji Oil Co., Ltd., Bobster) were mixed together according to a formulation specified in Table 1, and an aerated chocolate mass having a fat content of about 50% by weight and a specific gravity of 0.4 was produced by a conventional method. In the same manner as in Example 1, the mass thus obtained was formed into a sheet which was then cut with the heated wire. Some of the thus-obtained products when cut were broken due to the fragile nature, but most of them were a dice-shaped aerated chocolate having a flat cross section.

Example 6

Cacao mass, sugar, dry whole milk, cocoa butter, cocoa butter equivalent, lecithin, flavor, and BOB (manufactured by Fuji Oil Co., Ltd., Bobster) were mixed together according to a formulation specified in Table 1, and an aerated chocolate mass having a fat content of about 50% by weight and a specific gravity of 1.1 was produced by a conventional method. In the same manner as in Example 1, the mass thus obtained was formed into a sheet which was then cut with the heated wire to obtain a dice-shaped chocolate. The chocolate thus obtained was a dice-shaped product having a flat cross section that did not require care about the alignment of chocolate dices, although the level of a sharp melt-in-the-mouth sensation was somewhat low.

Comparative Example 1

Cacao mass, sugar, dry whole milk, cocoa butter, cocoa butter equivalent, lecithin, flavor, and BOB (manufactured by Fuji Oil Co., Ltd., Bobster) were mixed together according to a formulation specified in Table 1, and a chocolate mass having a fat content of about 50% by weight was produced by a conventional method. The chocolate mass was filled into a dice-shaped mold that had a one-side length of 18 mm and had a shape tapered at 3° so as to open in the direction of the opening. The mass in its portion close to the inner wall of the mold was solidified, and the other portion of the mass remaining unsolidified within the mold was then taken out from the mold to form shells. Separately, the chocolate mass prepared according to the formulation of Table 1 was mixed by an air mixer to prepare an aerated chocolate mass having a specific gravity of 0.85. The aerated chocolate mass was then filled into recesses in the shells. The bottom surface was flattened, followed by cooling to obtain a shell chocolate having a shape of a frustum of a regular pyramid in which the surfaces other than the bottom surface, that is, 5 surfaces out of the 6 surfaces, were covered with the shell.

In arranging the shell chocolate on a tray for packaging, the direction of the product that had been rolled in separating the product from the mold should be corrected. This disadvantageously rendered the process complicated. Further, in a major part of the shell chocolate, the outside of the aerated chocolate portion was covered with the chocolate portion in which micro bubbles were not dispersed. As a result, when the shell chocolate was placed in the mouth, sharp melting sensation could not be immediately provided.

The invention claimed is:

1. A method for producing an aerated fat-based confectionery, comprising cutting an aerated fat-based confectionery with a heated wire, wherein the aerated fat-based confectionary consists essentially of aerated chocolate and a thickness of the aerated chocolate is 15 mm or more.

2. The method for producing an aerated fat-based confectionery according to claim 1, wherein the aerated chocolate has a specific gravity of 0.5 to 1.0.

3. The method for producing an aerated fat-based confectionery according to claim 1, wherein the hot wire constituting the heated wire comprises a material that, when energized, generates heat and the surface temperature of the heated wire is 40 to 80° C.

4. The method for producing an aerated fat-based confectionery according to claim 1, wherein the fat content of the aerated chocolate is 30 to 60% by weight.

5. The method for producing an aerated fat-based confectionery according to claim 1, wherein the aerated chocolate is kept at room temperature during the cutting step.

6. The method for producing an aerated fat-based confectionery according to claim 1, wherein after cutting the heated wire is exposed to air or contacts a part of an equipment which comprises the heated wire.

7. The method for producing an aerated fat-base confectionery according to claim 1, wherein after cutting the aerated chocolate has no bloom.

8. The method for producing an aerated fat-based confectionery according to claim 1, wherein after cutting the aerated chocolate has a shape comprising a top surface and a bottom surface wherein the top surface and the bottom surface are parallel to each other; and a side surface which is perpendicular to the top surface and the bottom surface.

9. The method for producing an aerated fat-based confectionery according to claim 1, wherein after cutting the aerated chocolate has a rectangular parallelepiped shape.

* * * * *